(12) United States Patent
Blücher et al.

(10) Patent No.: US 7,641,423 B2
(45) Date of Patent: Jan. 5, 2010

(54) APPARATUS FOR CHIP REMOVING MACHINING

(75) Inventors: Mats Blücher, Fagersta (SE); Jonas Boman, Falun (SE); Thomas Eriksson, Falun (SE); Jan-Olf Lundeqvist, Fagersta (SE); Kaj Virtanen, Vasteras (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/609,489

(22) Filed: Jul. 1, 2003

(65) Prior Publication Data

US 2004/0057785 A1 Mar. 25, 2004

(30) Foreign Application Priority Data

Jan. 7, 2002 (SE) .................................... 0202029
Nov. 14, 2002 (SE) .................................... 0203356

(51) Int. Cl.
*B23B 51/02* (2006.01)
*B23B 51/06* (2006.01)

(52) U.S. Cl. .......................................... 407/66; 407/33

(58) Field of Classification Search ................. 407/103, 407/11, 66, 48, 113, 101, 40, 53, 33, 34, 407/64, 30, 114–116; 408/227, 133, 713
See application file for complete search history.

(56) References Cited

U.S. PATENT DOCUMENTS

| 5,833,403 | A | * | 11/1998 | Barazani | 407/101 |
| 5,863,162 | A | * | 1/1999 | Karlsson et al. | 408/230 |
| 6,146,060 | A | * | 11/2000 | Rydberg et al. | 407/40 |
| 6,146,061 | A | * | 11/2000 | Larsson | 407/103 |
| 6,270,294 | B1 | * | 8/2001 | Sjoo et al. | 407/101 |
| 6,312,199 | B1 | * | 11/2001 | Sjoden et al. | 407/11 |
| 6,599,050 | B1 | * | 7/2003 | Sjoo | 403/97 |
| 7,156,588 | B2 | * | 1/2007 | Elbaz et al. | 408/190 |

FOREIGN PATENT DOCUMENTS

DE 3448086 C2 12/1991

\* cited by examiner

*Primary Examiner*—Will Fridie, Jr.
(74) *Attorney, Agent, or Firm*—Drinker Biddle & Reath LLP (57) ABSTRACT

A device for chip removing machining includes first and second parts coupled together, wherein one of the parts includes a cutting edge. A coupling between the first and second parts includes two interacting surfaces and a clamp for forcing the surfaces together. The surfaces are profiled with male and female members, respectively, that are intercoupled to establish a form locking of the first and second parts against each other. The first and second parts are provided with central holes for receiving the clamp. The male and female members are configured to define only a single position of intercoupling.

5 Claims, 10 Drawing Sheets

APPARATUS FOR CHIP REMOVING MACHINING

This application claims priority under 35 U.S.C. §§ 119 and/or 365 to Patent Application Serial No 0202029-5 filed in Sweden on Jul. 1, 2002, and Patent Application Serial No. 0203356-1 filed in Sweden on Nov. 14, 2002, the entire contents of which are hereby incorporated by reference.

BACKGROUND OF THE INVENTION

The present invention relates to a coupling between a first part and a second part for use in chip removing machining, wherein the coupling comprises two interacting surfaces and members for forcing the surfaces together, wherein the surfaces are profiled with male and female members, respectively, in order to enable form locking against each other, that said coupling has a longitudinal center line, wherein both the first part and the second part are provided with a central hole for clamping the parts against each other. The invention also relates separately to a tool, a cutting head and a holder.

Through U.S. Pat. No. 6,146,060, a coupling in tools for chip forming machining is previously known, wherein the coupling comprises two interacting surfaces and members for forcing the surfaces together. The interacting surfaces are profiled with grooves in order to enable mutual form locking. Characteristic of the coupling according to U.S. Pat. No. 6,146,060 is that the interacting surfaces are arranged to comprise at least four separate positions in relation to each other.

Through DE-C2-34 48 086, a tool for internal turning is previously known, where the coupling between the cutting head and the holder comprises a surface having three radially extending bars and an interacting surface having three radially extending grooves. This means that the interacting surfaces may assume three separate positions in relation to each other. Another document of some interest is U.S. Pat. No. 5,863,162.

OBJECTS AND FEATURES OF THE INVENTION

One object of the present invention is to provide a coupling between two tool parts, which coupling may transfer a large torque at the same time as the tool parts only may assume one single position in relation to each other.

The object of the present invention is realised the combination of a first part and a second part coupled together for use in chip removing machining. A coupling between the first and second parts comprises two interacting surfaces and a clamping member for forcing the surfaces together. The interacting surfaces are profiled with male and female members, respectively, to establish form locking against each other. The coupling defines a longitudinal center line, wherein the first and second parts are provided with aligned holes that receive the clamping member. The male and the female members are configured to define only a single position of intercoupling.

Another aspect of the invention relates to a cutting head for chip removing machining which comprises a head surface adapted to interact with a holder surface of a holder. A center through-hole is formed in the cutting head and extends through the head surface. The head surface is profiled with either male or female members which are oriented asymmetrically relative to the through-hole.

The invention also relates to a holder adapted to be coupled with a cutting head for chip removing machining. The holder comprises a holder surface adapted to interact with a head surface of the cutting head. A center hole is formed in the holder and extends through the holder surface. The holder surface is profiled with either male or female members oriented asymmetrically relative to the hole.

BRIEF DESCRIPTION OF THE DRAWINGS

Below, embodiments of the invention will be described, wherein reference is made to the appended drawings.

DESCRIPTION OF PREFERRED EMBODIMENTS OF THE INVENTION

Figure 1:
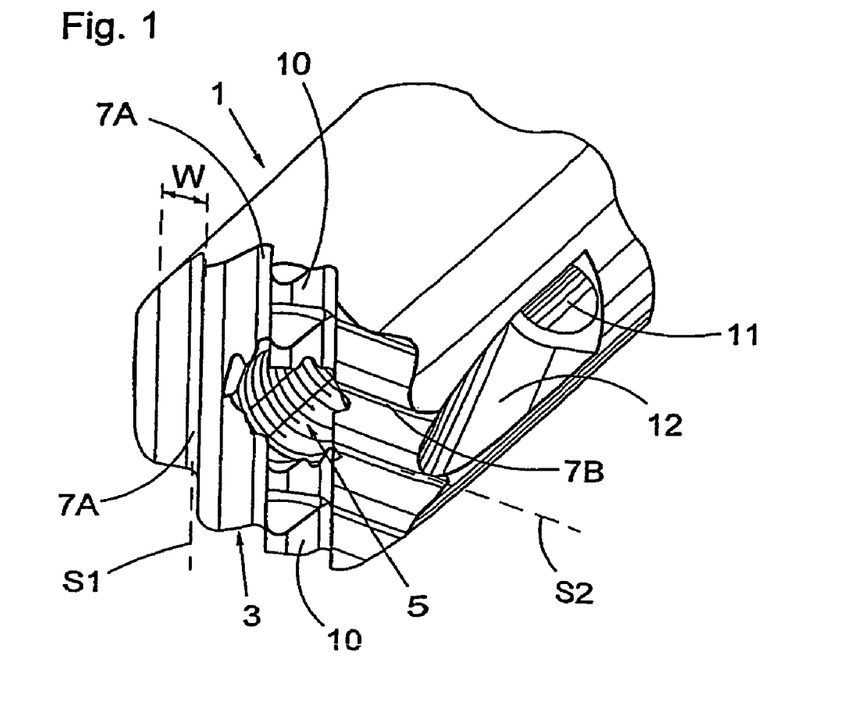
FIG. 1 shows a perspective view of the part of a holder according to the present invention that comprises a connecting surface.

The holder 1 shown in FIG. 1 may, for instance, be manufactured from steel or cemented carbide. The free end of the holder 1 shown in FIG. 1 comprises a front surface 3 and a threaded hole 5. The front surface 3 has a circular basic shape and comprises two sets of grooves 7A and 7B, respectively. Each set of grooves 7A and 7B, respectively, covers generally half the front surface 3 and comprises a number of identical spaced-apart first and second sets of female members 7A, 7B in the form of grooves (channels). The first grooves 7A have a first main direction S1 and the second grooves 7B have a second main direction S2, which main directions S1 and S2 are perpendicular to each other. The two sets of grooves 7A and 7B adjoin and overlap each other. Each first groove 7A in the first set intersects the envelope surface of the holder 1 in two regions, while each second groove 7B in the second set of grooves intersects the envelope surface of the holder 1 in one region. Each groove 7A and 7B has a maximum width W and in absolute measurements, the groove has a width of 0.2-2 mm, preferably approx. 1.5 mm. Each groove has two flanks, which via a sharp or rounded transition connect to a groove bottom. The flanks form an angle within the interval 40°-80°, preferably 55°-60°. As for the more detailed design of the cross-section geometry of the grooves, reference is made to relevant parts of the description in U.S. Pat. No. 6,146,060, the disclosure of which is incorporated by reference herein.

In the embodiment shown in FIG. 1, the first set of grooves 7A has been manufactured by slab milling or grinding, the feeding direction being parallel with the first main direction S1. Then, the second set of grooves 7B has been machined with the same tool in a direction parallel with the second main direction S2. In order to obtain full depth in each second groove 7B, it is convenient that the tool is fed a distance into the first set of grooves 7A. Thereby, the tool will also machine material that is included in the first set of grooves 7A, which is seen in FIG. 1, wherein entirely or partly pyramid-shaped male members or first tips 10 are formed in the termination of the second set of grooves 7B in the first set of grooves 7A. In the embodiment according to FIG. 1, the first set comprises three grooves 7A, while the second set comprises four grooves 7B. The arrangement of first and second sets of grooves 7A and 7B in the front surface 3 involves a significantly larger specific surface than if this surface would have been planar.

The holder 1 according to FIG. 1 also comprises a channel 11 for cooling medium, wherein this channel 11 exits in a countersink 12 in the envelope surface of the holder 1 to form a fluid exit port. The significance of the location of the cooling channel 11 in the holder 1 will be explained in the description below.

Figure 2:
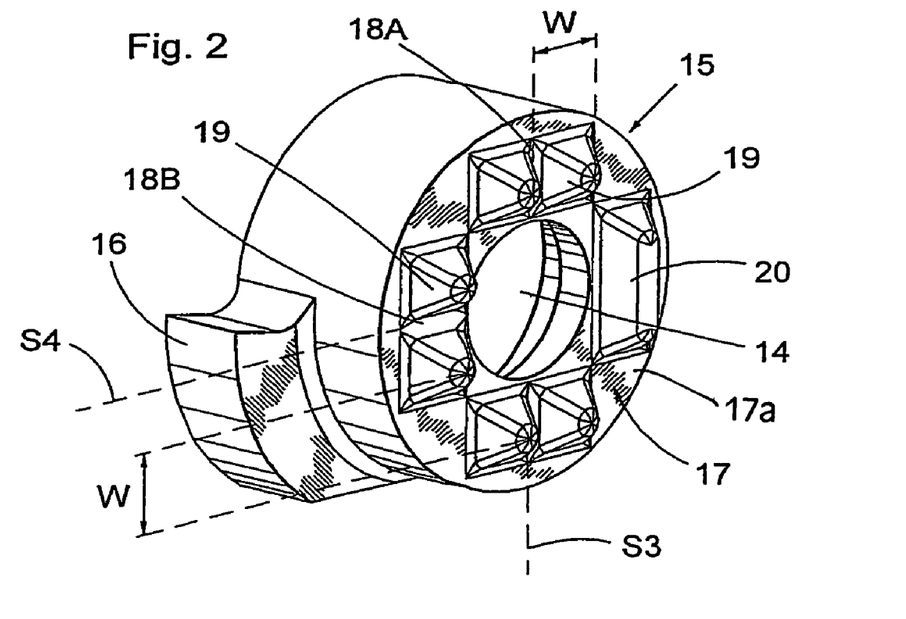
FIG. 2 shows a perspective view of a cutting head according to the present invention.

The cutting head 15 according to the present invention shown in FIG. 2 is preferably intended to be used at internal turning. The cutting head 15 may, for instance, be manufactured from cemented carbide, cermet or high speed steel. The cutting head 15 is generally circular cylindrical with an edge portion 16 that extends radially beyond the rest of the cutting head 15. The edge portion 16 is in the conventional way provided with rake faces and flank surfaces. The cutting head 15 is also provided with a through-going central hole 14, which is intended to interact with a locking screw, see below.

The cutting head 15 is provided with a support surface 17, which generally has a circular shape and comprises a third and a fourth set of grooves. The third set comprises a number of third grooves 18A having a third main direction S3, while the fourth set comprises a number of fourth grooves 18B having a fourth main direction S4, which main directions S3 and S4 are perpendicular to each other and perpendicular (technically, orthogonal) to the center line CL. In the shown embodiment of the cutting head 15, three third grooves 18A and three fourth grooves 18B are arranged. Since the third and fourth main directions S3 and S4 generally intersect each other, entirely or partly pyramid-shaped second tips 19 are formed, however with a certain exception according to the principle of the present invention. This will be more thoroughly elucidated below. As for the cross-sectional geometry of the third and fourth grooves, 18A and 18B, reference is made to what has been described above concerning the first and second sets of grooves 7A and 7B. The arrangement of third and fourth sets of grooves 18A and 18B in the support surface 17 involves a significantly larger specific surface than if this surface would have been planar. The cutting head 15 according to FIG. 2, with the third and fourth sets of grooves in the support surface 17, may for instance be manufactured by direct pressing or injection molding and subsequent sintering. As for the sets of grooves, these may also be produced by means of grinding.

In the embodiment illustrated of the cutting head 15, the mutual positioning of the components belonging to the cutting head 15 is such that an imaginary plane that extends in the axial direction, through the center of the hole 14 and in the fourth main direction S4 intersects the edge portion 16, the groove 18B, as well as an elongate ridge 20.

An exceptionally important feature for the groove configuration of the cutting head 15 is that the middle groove 18B in the fourth main direction S4 only extends across a part of the support surface or head surface 17, which more generally may be expressed as that at least one groove in one of the sets of grooves 18B extends across only a part of the support surface 17. This entails that an elongate ridge 20 is formed, which is not penetrated by the middle groove 18B in the set of grooves that has the fourth main direction S4. The ridge 20 constitutes a stop in the groove 18B. An imaginary extension line of the ridge extends offset or spaced from the longitudinal central axis of the tool. The making of the elongate ridge 20, which has the maximum extension thereof in the third main direction S3, entails that the cutting head 15 may only be mounted in one way in the holder 1, which is realized by studying the groove configuration for the front surface or holder surface 3 of the holder 1. That is to say, when viewed in a direction perpendicular to the surface 17, the tips 19 and the ridge 20 of the head surface 17 extend axially to different extents than a flat part 17a of the surface 17 and thus an axially irregular profile is defined which is to be received in a corresponding axially irregular profile of the holder surface 3 defined by the grooves and the ridges alternating therewith. When the head surface 17 is being intercoupled with the holder surface, the holder surface "sees" a particular configuration (e.g., a "first" configuration) of the tips and ridges which enables the intercoupling to occur. However, if the head surface were to be rotated even slightly about the center axis of the cutter head, the intercoupling could not occur, because the respective profiles of the surfaces 3, 17 would no longer fit into one another (e.g. the ridge 20 would no longer be aligned with the groove 7A of the holder surface). Accordingly, it can be stated that the configurations presented by the holder surface in all other angular positions thereof about the center axis of the tool are different from the first configuration, whereby there is only a single position in which the cutting head and the holder can be intercoupled. This can also be said of the holder.

Figure 3:
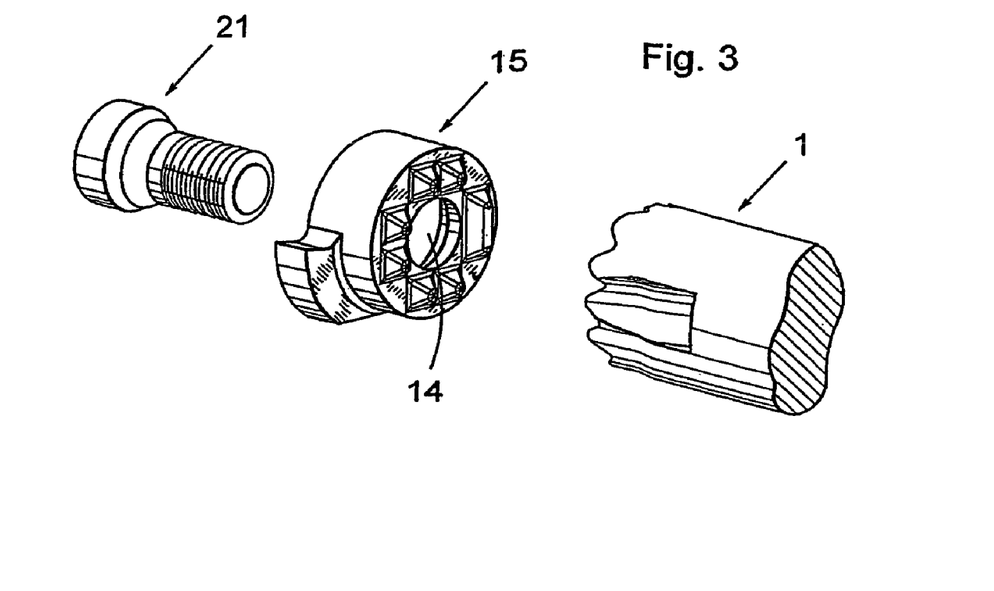
FIG. 3 shows an exploded view in perspective of a tool according to the present invention.
Figure 4:
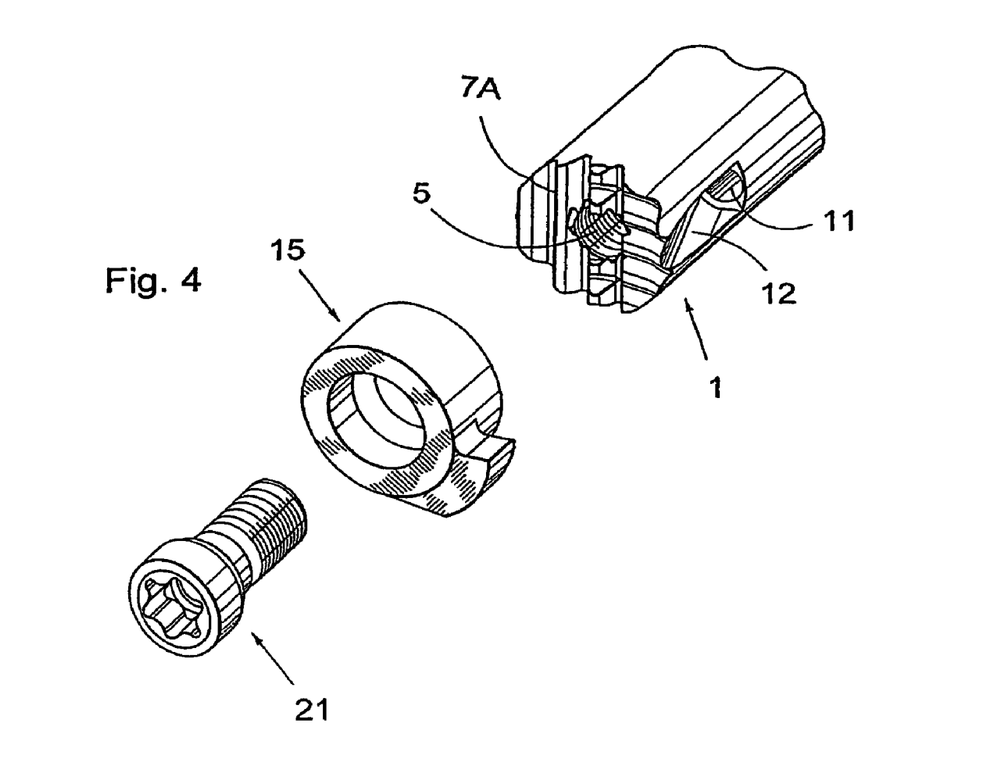
FIG. 4 shows an exploded view in perspective, in another angle than FIG. 3, of a tool according to the present invention.
Figure 5:
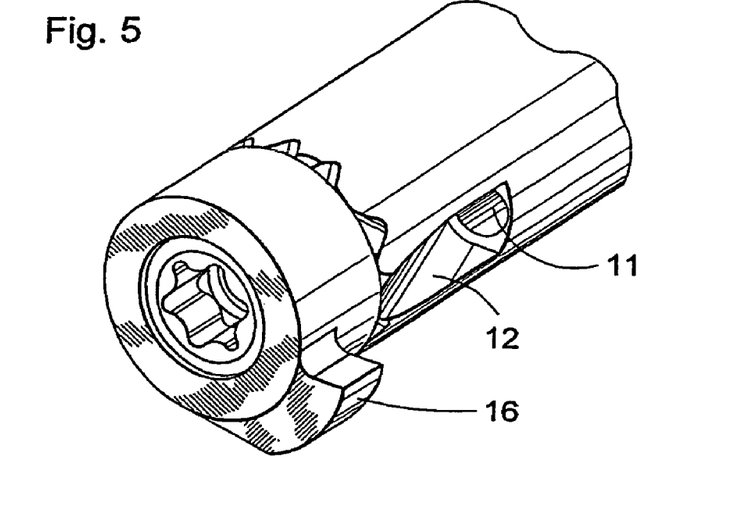
FIG. 5 shows a perspective view of a tool according to the present invention, where the parts included in the tool are interconnected.

In order to illustrate the assembly of the cutting head 15 on the front surface 3 of the holder 1, reference is made to FIGS. 3-5. As is seen in these Figures, the cutting head 15 is fixed in relation to the holder 1 via a locking screw 21, which extends through the through-going hole 14 of the cutting head 15 and into the threaded hole 5 of the holder 1. As is seen in FIG. 4, the cutting head 15 is provided with a step or the like, in connection with the through-going hole 14, for interaction with a head of the locking screw 21.

When the support surface 17 of the cutting head 15 is brought into contact with the front surface 3 of the holder 1, (whereby the surfaces 3, 17 constitute interactive surfaces) the elongate ridge 20 of the cutting head 15 is to be received in the first groove 7A that is positioned farthest out, which extends in the first main direction S1. By observing the groove configurations of the front surface 3 and the support surface 17, it is realized that the only place where the elongate ridge 20 may be received is in the first groove 7A positioned farthest out in the first set of grooves. Thereby, the risk of the cutting head 15 being mounted in an incorrect position has been eliminated. In this connection, it should be mentioned that if the cutting head 15 is mounted in an incorrect position in relation to the holder 1, a tilting of the cutting head 15 in relation to the holder 1 will occur, which is so big that it is not possible for the locking screw 21 to enter the threaded hole 5 of the holder 1.

In FIG. 5, the cutting head 15 is shown in a mounted state on the holder 1. Since the cutting head 15 only may be mounted in a single predetermined position on the holder 1, it is possible to arrange the cooling channel 11 in such a way that cooling medium coming out from the same is directed towards the edge portion 16 of the cutting head 15. Thereby, the possibilities are improved for a satisfactory cooling of the cutting edge when the same performs chip removing machining of a workpiece.

Figure 6:
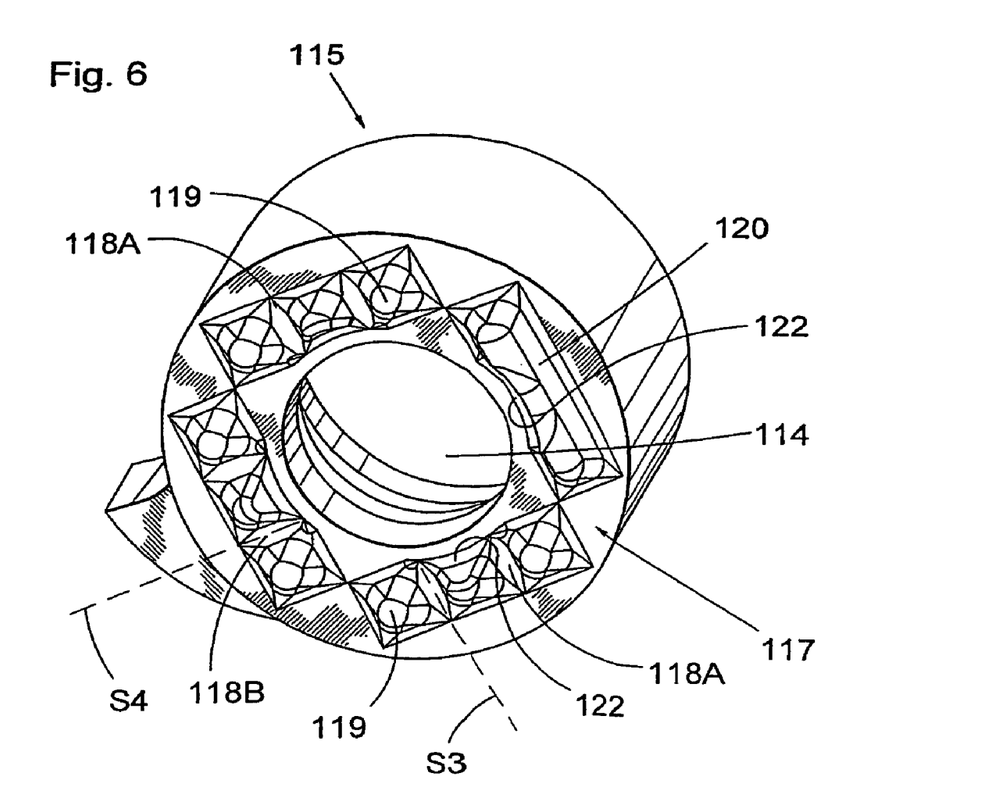
FIG. 6 shows a perspective view of an alternative embodiment of a cutting head according to the present invention.

The alternative embodiment of a cutting head 115 according to the present invention shown in FIG. 6 principally differs from the cutting head 15 according to the above by the number of grooves in each set that are arranged in the support surface 117 of the cutting head. Thus, each set of grooves 118A, 118B of the cutting head 115 comprises an additional groove in comparison with the cutting head 15. In a way corresponding to the cutting head 5, the sets of female members or grooves 118A and 118B have a main direction each, S3 and S4, respectively, which are perpendicular to each other. By the fact that the grooves 118A and 118B intersect each other, entirely or partly pyramid-shaped male members or tips 119 are formed, however with a certain exception according to the principle of the present invention. The two middle grooves 118B in the fourth main direction S4 extend across only a part of the support surface 117. This entails that an elongate ridge 120, is formed, which is not penetrated by the middle grooves 118B in the set of grooves that has the fourth main direction S4. The making of the elongate ridge 120, which has the maximum extension thereof in the third main direction S3, entails that the cutting head 115 can only be mounted in one way in an appurtenant holder, having a groove configuration according to same principles as the holder 1, however fifting against the cutting head 115. An imaginary extension line of the elongated ridge 20 extends offset or spaced from a longitudinal central axis of the cutting head.

As is seen in FIG. 6, the pyramid-shaped tips 119 positioned closest to the hole 114 and the portion of the ridge 120 positioned closest to the hole 114 are provided with a recess 122, which is arranged for manufacturing-technical reasons since a certain amount of clearance is required around the hole 114.

Figure 7:
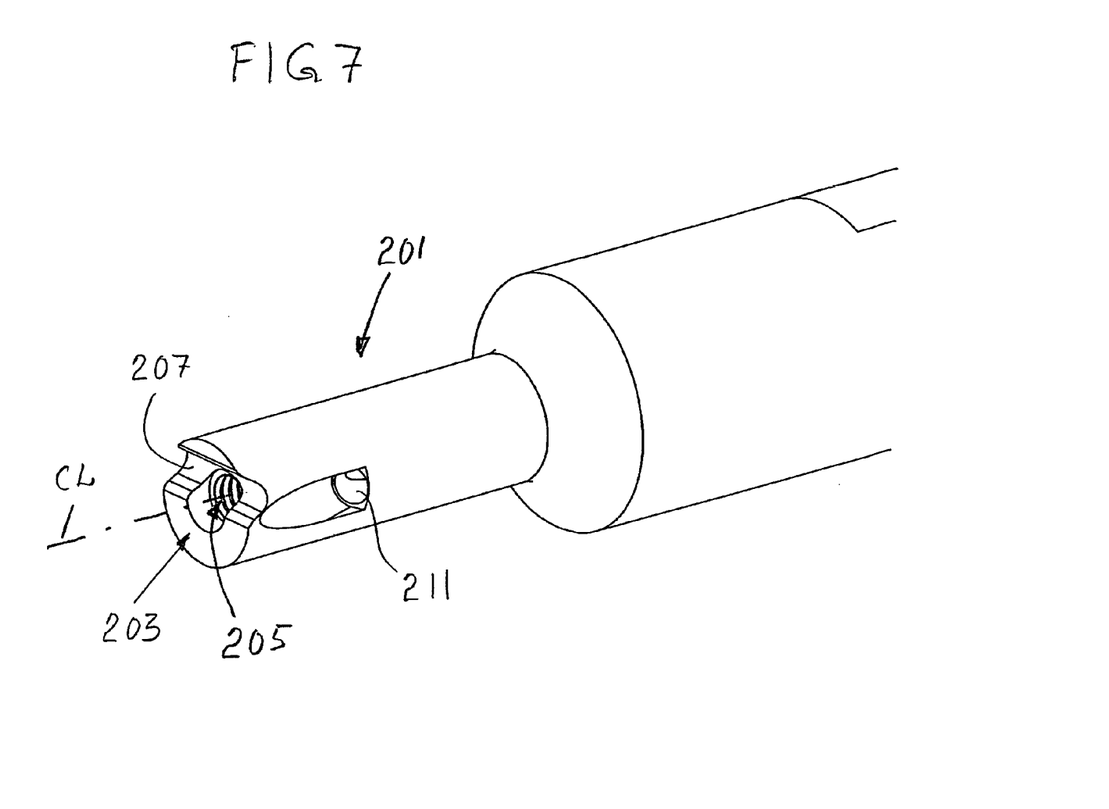
FIG. 7 shows a perspective view of an alternative embodiment of holder according to the present invention, wherein the holder comprises a connecting surface.
Figure 8:
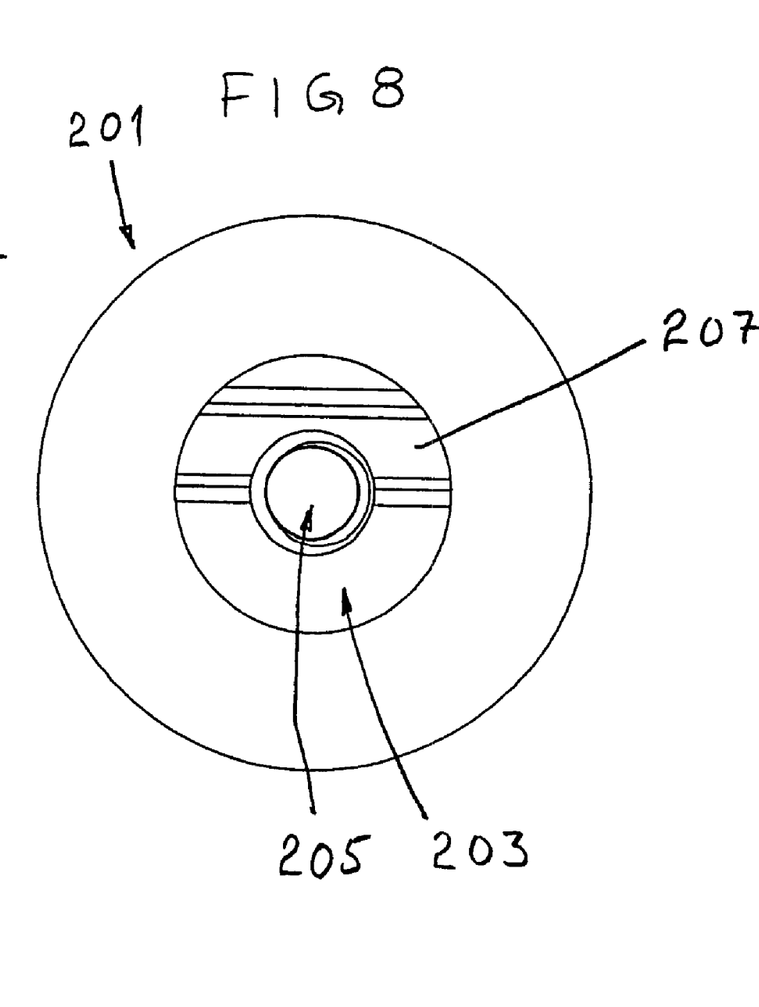
FIG. 8 shows a front view of the holder according to FIG. 7.

The alternative embodiment of a holder 201 illustrated in FIGS. 7 and 8 comprises a front surface 203 as well as a threaded hole 205. The front surface 203 has a generally circular cross-section and has a female member or groove 207, which is asymmetrically located in respect of a longitudinal center line CL of the holder 201. In the embodiment according to FIGS. 7 and 8, the groove 207 is located substantially in one half of the front surface 203.

Figure 9:
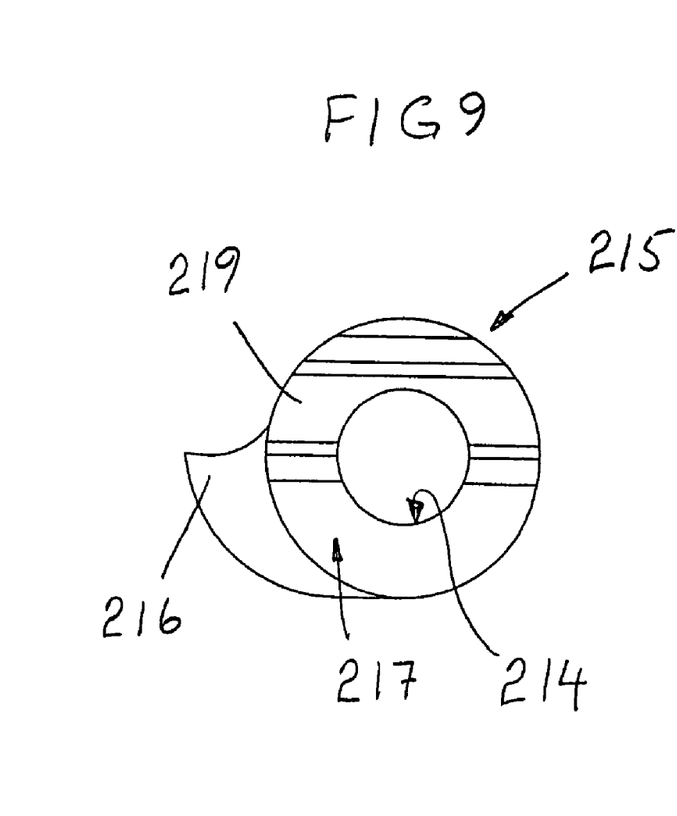
FIG. 9 shows an end view of a cutting head, which is intended to be mounted on the holder according to FIGS. 7 and 8.

The cutting head 215 illustrated in FIG. 9 is intended to be mounted on the holder 201. Generally, the cutting head 215 has a basic shape corresponding to the cutting heads 15; 115 and is provided with an edge portion 216 for groove slotting or parting. The cutting edge of the edge portion runs substantially parallel with the center line CL. The cutting head 215 also has a support surface 217, which is intended to abut against the front surface 203 when the cutting head 215 is mounted on the holder 201. The cutting head 215 has a male member or ridge 219 attached on the support surface, which is situated substantially on one of the halves of the support surface 217. The ridge 219 has a shape substantially complementary against the groove 207. By studying the holder 201 and the cutting head 215, it is realized that the cutting head 215 can be mounted in only one way in the holder 201 by virtue of the location of the groove 207 and the ridge 219. A locking screw (not shown) thus extends through holes 205, 214 in the holder 201 and the cutting head 215, respectively.

Figures 10, 12:
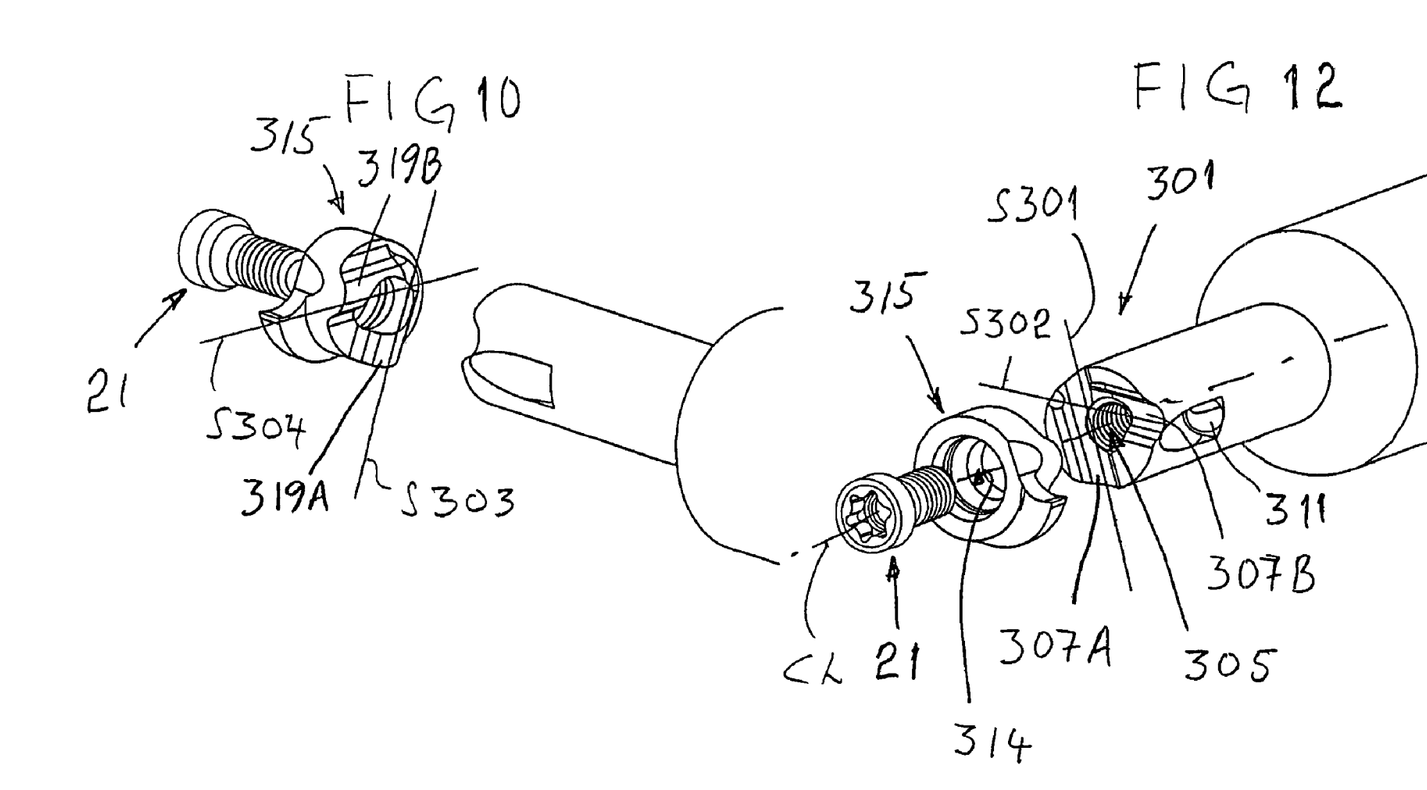
FIG. 10 shows an exploded view obliquely from behind of an additional alternative embodiment of a tool according to the present invention.
FIG. 12 shows a an exploded view obliquely from the front of the tool according to FIG. 10.
Figure 11:
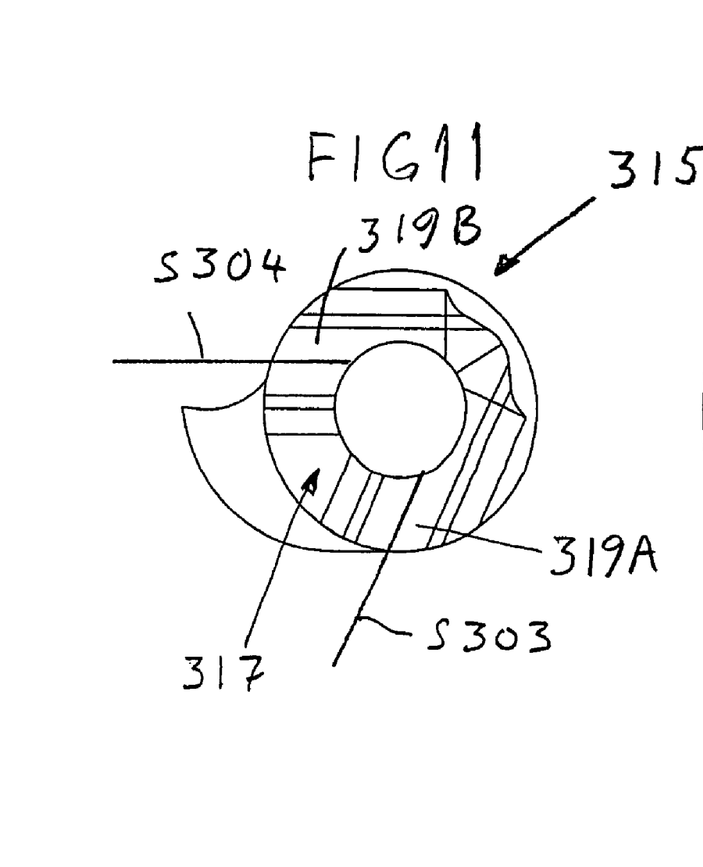
FIG. 11 shows an end view of the cutting head that is included in the tool according to FIG. 10.
Figure 13:
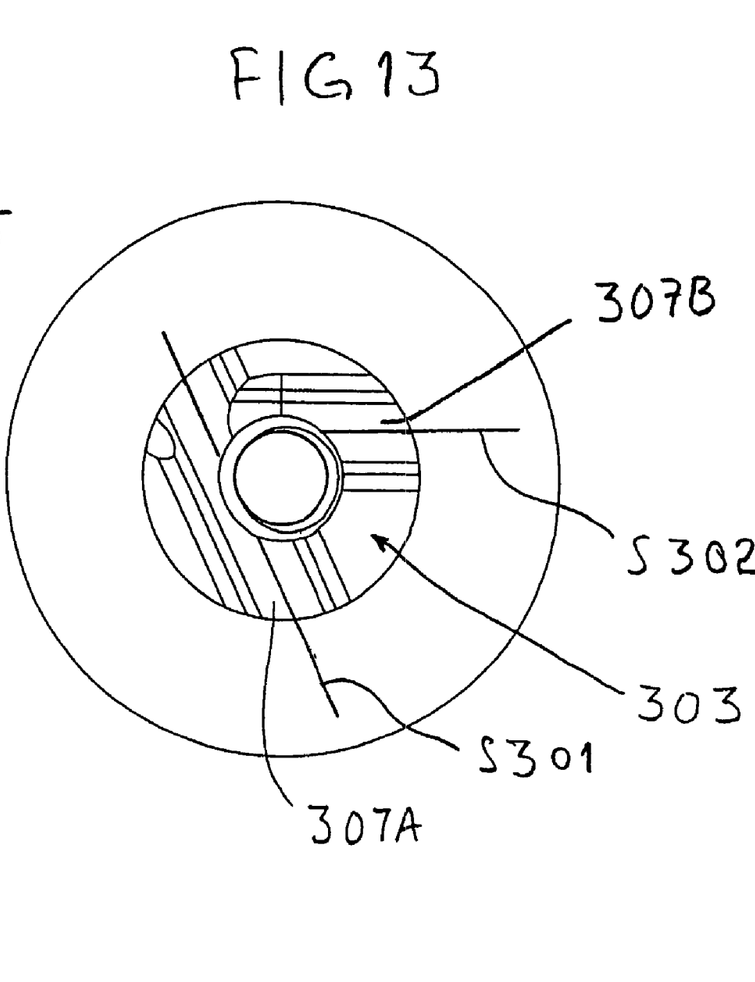
FIG. 13 shows an end view of the holder that is included in the tool according to FIG. 10.
Figure 14:
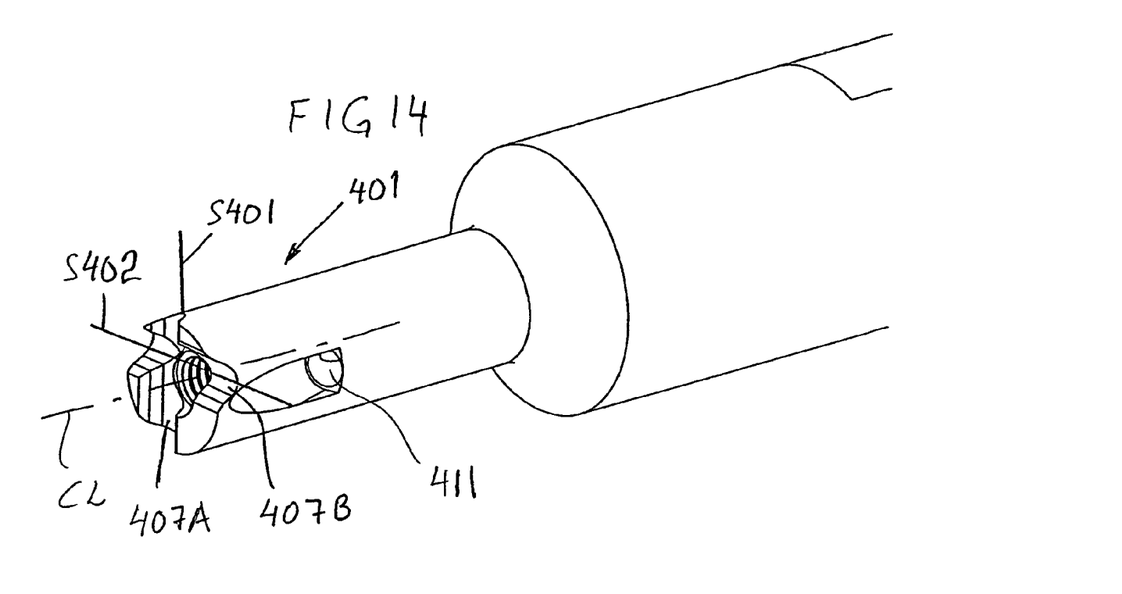
FIG. 14 shows a perspective view of yet an embodiment of a holder that is included in a tool according to the present invention.
Figure 15:
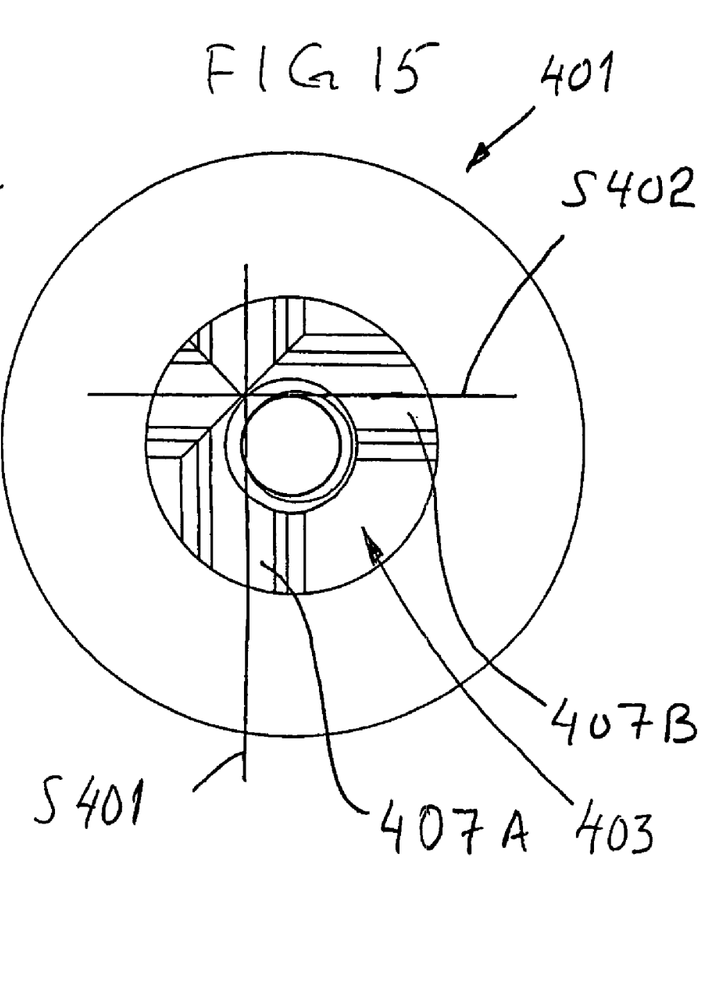
FIG. 15 shows an end view of the holder according to FIG. 14.
Figure 16:
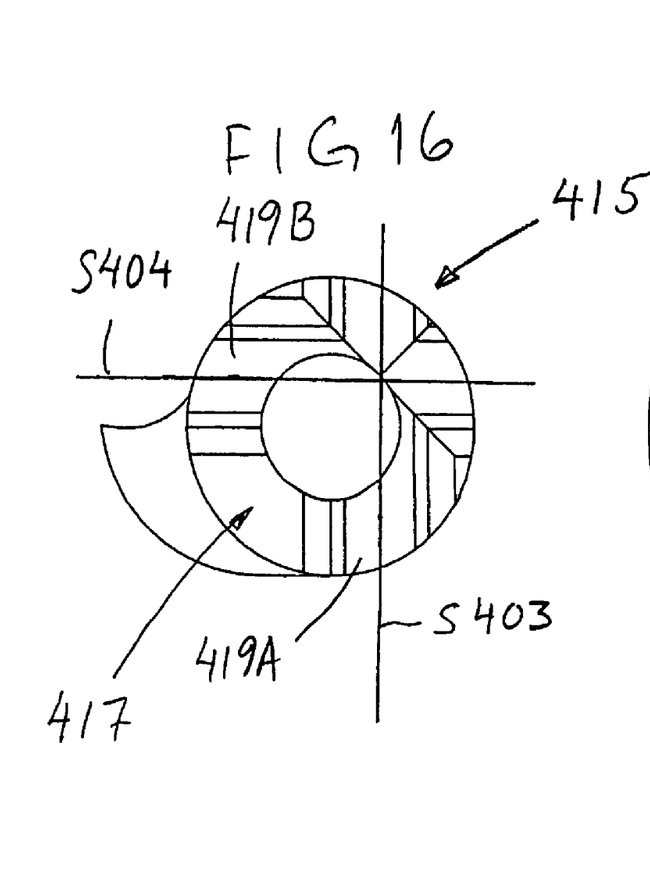
FIG. 16 shows an end view of a cutting head which is intended to be mounted on the holder according to FIGS. 14 and 15.

In the alternative embodiment of the parts included in a tool according to the present invention illustrated in FIGS. 10-13, the holder 301 has in principle a female member in the form of a corresponding groove 307B as the groove 207 of the holder 201. However, the holder 301 has an additional second groove 307A, wherein the main direction of the groove 307A is designated S301 and the main direction of the groove 307B is designated S302. As is seen in FIGS. 12 and 13, the main directions S301 and S302 are located in a common plane and do not form a right angle with each other. The cutting head 315 is generally constructed correspondingly as the cutting heads 15; 115; 215. A locking screw 21 passes through a hole 314 of the cutting head 315 and extends into a threaded hole 305 of the holder 301, wherein the locking screw 21 provides a joint between the cutting head 315 and the holder 301. The cutting head 315 has male members in the form of a first ridge 319A and a second ridge 319B, which have the main directions S303 and S304, respectively. Correspondingly, the main directions S303 and S304 are located in a common plane and do not form a right angle with each other. When the cutting head 315 is mounted on the holder 301, the ridges 319A and 319B are received in the grooves 307A and 307B, respectively.

In the alternative embodiment of the parts included in a tool according to the present invention illustrated in FIGS. 14-17, the holder 401 is provided with two grooves 407A and 407B, the main directions of which are designated S401 and S402, respectively. Said main directions S401 and S402 are located in a common plane and form a right angle with each other. The cutting head 415 is generally constructed correspondingly as the cutting head 315, however the main directions S403 and S404 for the male ridges 419A and 419B form a right angle with each other. The cutting head 415 is intended to be mounted on the holder 401, wherein the ridges 419a and 419B are received in the female grooves 407A and 407B, respectively.

Common for all the above-described embodiments it is applicable that the holder (1; 201; 301; 401) is integrated with a shaft, which is intended to be mounted in a machine tool.

Common for all the above-described the embodiments, it is applicable that the front surface 3; 203; 303; 403 and the support surface 17; 117; 217; 317; 417 preferably have an extension perpendicularly to the longitudinal center line CL of the tool.

Figure 17:
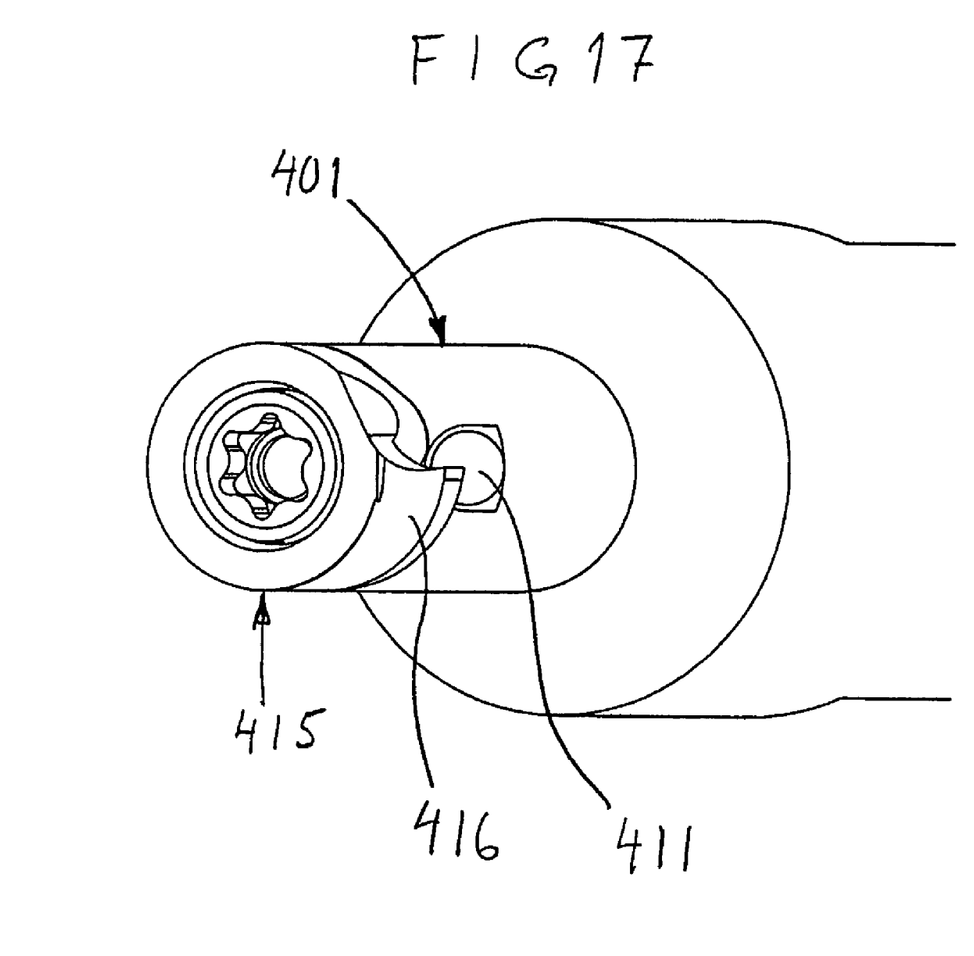
FIG. 17 shows a perspective view of a tool according to FIGS. 14-16, wherein the observer views straight into the cooling medium channel.

Common for all the above-described the embodiments is that the cutting heads 15; 115; 215; 315; 415 only can be mounted in one way in the appurtenant holder 1; 201; 301; 401, which has been provided by the location of the grooves and the ridges. This is of particular importance in order for the cooling of the cutting head 15; 115; 215; 315; 415 of the tool to work. By the fact that the cutting head 15; 115; 215; 315; 415 and the holder 1; 201; 301; 401 may assume only one mutual position in relation to each other, cooling medium from the cooling medium channel 11; 211; 311; 411 will be directed towards the edge portion 16; 116; 216; 316; 416 of the cutting head 15; 115; 215; 315; 415. This is illustrated in FIG. 17 for the holder 401 and the cutting head 415, wherein is seen that an imaginary extension of the cooling medium channel 411 intersects the edge portion 416. The same design is preferably applicable generally for all the above-described embodiments.

By the phrase "form locking", it should in the present case be appreciated that the male and the female members (the ridges and the grooves, respectively) have a mutual flank abutment (linear abutment) but that there need not be a complete correspondence as regards the shape of the male and the female members. In addition to the above exemplified male and female members, i.e., the ridges and grooves, for instance, a generally protruding part which interacts with a recess having a shape so that form locking is provided between the interacting members is also feasible within the scope of the present invention. Thus, the max. and min. points of the interacting male and female members, respectively, become located at a distance from the center line of the central hole.

Generally, it is applicable for the tool according to the present invention and the components included in this tool that It preferably involves small dimensions. Thus, the diameter/across corner dimension for the tool/cutting head/holder is normally within the interval of 5-10 mm. The protrusion of the edge portion 16; 116; 216; 316; 416 from the rest of the cutting head 15; 115; 215; 315; 415 is normally within the interval of 2-5 mm.

For the embodiments according to FIGS. 7-17, it is applicable that the asymmetrical location of the grooves 207; 307A, 307B; 407A, 407B involves that these are given a certain elastic deformation, i.e. that they widen somewhat at interaction with an appurtenant ridge 219; 319A, 319B; 419A, 419B. This is facilitated by the asymmetrical location, since there is significantly less material on one of the sides of the grooves 207; 307A, 307B; 407A, 407B. The elastic deformation promotes a satisfactory abutment between the front surface 3; 203; 303; 403 and the support surface 17; 117; 217; 317; 417.

Feasible Modifications of the Invention:

In the embodiments described above, the elongate ridge 20; 120 is arranged on the cutting head 15; 115. This means that it is the cutting head 15; 115 which is in principle modified in comparison with the known technique that is described in U.S. Pat. No. 6,146,060. This means that the new cutting heads 15; 115 according to the present invention may in principle fit in a holder according to U.S. Pat. No. 6,146,060, which of course is an exceptionally great advantage.

However, within the scope of the present invention, it is also feasible that the groove configurations swap locations, i.e., that the front surface of the holder is provided with an elongate ridge. This is generally applicable for all the above-described embodiments.

In the embodiments described above according to FIGS. 1-6, the elongate ridge 20; 120 has been given a location on the cutting head 15; 115 as far away as possible from the edge portion 16; 116. However, alternative locations of the elongate ridge on the cutting head are also feasible within the scope of the invention. Thus, the elongate ridge may still have an extension in the third main direction S3 but be positioned closer to the edge portion 16; 116. The elongate ridge may also have an extension in the fourth main direction S4. It is generally applicable that in a modification of the location of the elongate ridge on the cutting head 15; 115, a corresponding modification of the groove configuration on the front surface 3 of the holder 1 must be carried out. In case the elongate ridge is located on the front surface 3 of the holder 1, corresponding alternative locations are naturally feasible, wherein also in this case a modification of the groove configuration of the support surface of the cutting head is required. Alternative locations of the ridge and the groove are shown in the embodiments according to FIGS. 7-17.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Apparatus for chip removing machining comprising a first part and a second part coupled together by a coupling, wherein the coupling comprises two interacting surfaces and a clamping member for forcing the surfaces together, the interacting surfaces being profiled with male and female members, respectively that are intercoupled to establish a firm locking of the first and second parts against each other, said coupling defining a longitudinal center line, wherein the first and the second parts are provided with aligned holes for receiving the clamping member, wherein the male and the female members are oriented on the interacting surfaces such that the male and female members intercouple only in a single position, the orientation of the male and female members prevents the male and female members from intercoupling in another position, wherein the first part includes a channel for cooling medium, the channel defines a fluid exit port in an envelope surface of the first part.

2. The apparatus according to claim 1 wherein the male and female members are spaced from the center line.

3. The apparatus according to claim 1 wherein the male and female members extend orthogonally relative to the center axis.

4. The apparatus according to claim 1 wherein one of the first and second parts comprises a turning tool having only a single active cutting edge, wherein incorrect positioning of the cutting edge is prevented by the male and female members being intercoupled in the single position.

5. The apparatus according to claim 1 wherein the male and female members are arranged asymmetrically with respect to the center hole.

* * * * *